US011237043B2

(12) United States Patent
Rombach et al.

(10) Patent No.: US 11,237,043 B2
(45) Date of Patent: Feb. 1, 2022

(54) STRESS REDUCED DIAPHRAGM FOR A MICRO-ELECTRO-MECHANICAL SYSTEM SENSOR

(71) Applicants: INVENSENSE, INC., San Jose, CA (US); TDK Electronics AG, Munich (DE)

(72) Inventors: Pirmin Rombach, San Jose, CA (US); Sushil Bharatan, Burlington, MA (US)

(73) Assignee: INVENSENSE, INC., San Jose, CA (US)

( * ) Notice: Subject to any disclaimer, the term of this patent is extended or adjusted under 35 U.S.C. 154(b) by 166 days.

(21) Appl. No.: 16/542,452

(22) Filed: Aug. 16, 2019

(65) Prior Publication Data
US 2020/0056935 A1 Feb. 20, 2020

Related U.S. Application Data

(60) Provisional application No. 62/765,087, filed on Aug. 17, 2018.

(51) Int. Cl.
*G01H 11/06* (2006.01)
*G01L 9/00* (2006.01)

(52) U.S. Cl.
CPC ............ *G01H 11/06* (2013.01); *G01L 9/0072* (2013.01)

(58) Field of Classification Search
CPC ................................ G01H 11/06; G01L 9/0072
See application file for complete search history.

(56) References Cited

U.S. PATENT DOCUMENTS 6,535,460 B2 * 3/2003 Loeppert ............... B81B 3/0072
367/181
9,723,423 B2 * 8/2017 Uchida ................. H04R 19/005
(Continued)

FOREIGN PATENT DOCUMENTS

| EP | 2164 280 A1 | 3/2010 | |
| EP | 2164280 A1 * | 3/2010 | ........... H04R 19/005 |
| JP | 3399688 B2 | 4/2003 | |

OTHER PUBLICATIONS

International Search Report and Written Opinion received for PCT Application Serial No. PCT/US2019/046807 dated Nov. 14, 2019, 25 pages.

(Continued)

*Primary Examiner* — Nathaniel T Woodward
(74) *Attorney, Agent, or Firm* — Amin, Turocy & Watson, LLP

(57) ABSTRACT

A micro-electro-mechanical system (MEMS) sensor can comprise a substantially rigid layer having a center. The MEMS sensor can further comprise a movable membrane that can be separated by a gap from, and be disposed substantially parallel to, the substantially rigid layer. The MEMS sensor can further include a plurality of pedestals extending into the gap, where a first pedestal of the plurality of pedestals can be of a first size, and be disposed a first distance from the center, and a second pedestal of the plurality of pedestals can be a second size different from the first size, and be disposed at a second distance from the center. In another aspect, the substantially rigid layer and the movable membrane can be suspended by a plurality of suspension points. In another aspect, at least one of the plurality of pedestals can be disposed so as to limit a deformation of the movable membrane.

20 Claims, 9 Drawing Sheets

(56) References Cited

U.S. PATENT DOCUMENTS

| | | | | |
|---|---|---|---|---|
| 9,958,315 | B2* | 5/2018 | Inoue | H04R 19/005 |
| 10,448,168 | B2* | 10/2019 | Wang | H04R 19/005 |
| 10,623,852 | B2* | 4/2020 | Cargill | B81B 3/0078 |
| 10,638,236 | B2* | 4/2020 | Klein | H04R 31/00 |
| 2015/0264462 | A1* | 9/2015 | Okugawa | H04R 19/04 |
| | | | | 381/174 |
| 2018/0352337 | A1 | 12/2018 | Klein | |

OTHER PUBLICATIONS

Preliminary Report on Patentability for International Application No. PCT/US2019/046807 dated Mar. 4, 2021, 8 pages.

\* cited by examiner

STRESS REDUCED DIAPHRAGM FOR A MICRO-ELECTRO-MECHANICAL SYSTEM SENSOR

CROSS-REFERENCE TO RELATED APPLICATION

This patent application claims priority to U.S. Provisional Patent Application No. 62/765,087, filed on Aug. 17, 2018, and entitled "STRESS REDUCED DIAPHRAGM," this application hereby being incorporated by reference herein.

TECHNICAL FIELD

This disclosure generally relates to embodiments for a device comprising a micro-electro-mechanical systems (MEMS), and more particularly to MEMS sensors.

BACKGROUND

MEMS sensors, include audio and pressure sensors, can be composed of a membrane suspended over a rigid surface. This membrane can be subject to uneven levels of stress in some circumstances. This uneven stress can cause problems, especially when MEMS sensors are exposed to sound or pressure levels approaching or in excess of their pressure level capabilities.

Consequently, conventional MEMS technologies have had some drawbacks, some of which may be noted with reference to the various embodiments described herein.

SUMMARY

The following presents a simplified summary of one or more of the embodiments of the present invention in order to provide a basic understanding of the embodiments. This summary is not an extensive overview of the embodiments described herein, e.g., it is intended to neither identify key or critical elements of the embodiments nor delineate any scope of embodiments or the claims. A purpose of this summary is to present some concepts of the embodiments in a simplified form as a prelude to the more detailed description that is presented later. It will also be appreciated that the detailed description may include additional or alternative embodiments beyond those described in the Summary section.

Generally speaking, the present disclosure recognizes and addresses, in at least certain embodiments, the issue of excessive sound pressure on a MEMS sensor. Some of the disclosed systems and methods provide for a plurality of pedestals of different lengths to reduce the stress on different components of the MEMS sensor, e.g., at edge points where a movable membrane is suspended over the substantially rigid layer.

In one or more embodiments, a MEMS sensor can comprise a substantially rigid layer having a center and a movable membrane separated by a gap from, and disposed substantially parallel to, the substantially rigid layer. In the one or more embodiments, the MEMS sensor can further comprise a plurality of pedestals extending into the gap, where a first pedestal of the plurality of pedestals can be of a first size, and be disposed a first distance from the center, and a second pedestal of the plurality of pedestals can be of a second size different from the first size, and be disposed at a second distance from the center. In another aspect, the plurality of pedestals can be disposed on the substantially rigid layer, extending into the gap. In an alternative embodiment, the plurality of pedestals can be disposed on the movable membrane, extending into the gap. In another aspect, the substantially rigid layer and the movable membrane can be suspended by a plurality of suspension points, and a stress on the movable membrane can be substantially located at a suspension point of the plurality of suspension points. In another aspect, at least one of the plurality of pedestals can be disposed so as to limit a deformation of the movable membrane.

In another aspect, the first size can be selected based on a stress on the movable membrane. In another aspect of one or more embodiments, at least one of the first size the second size can be selected to reduce the stress on the movable membrane. In another aspect, the first pedestal can be shorter than the second pedestal. In another aspect, the first distance can be closer to the center than the second distance. In aspects of additional embodiments, the reduction of the stress on the movable membrane is based on at least one of the plurality of pedestals being disposed so as to limit a deformation of the movable membrane. In another aspect, the MEMS sensor of one or more embodiments can be one of an acoustic sensor or a pressure sensor.

In other embodiments, a method can comprise disposing, on a surface comprising one of a movable membrane or a substantially rigid layer, a plurality of pedestals, with a first pedestal of the plurality of pedestals being a first size, and disposed a first distance from a center of the surface, and a second pedestal of the plurality of pedestals can be of a second size different from the first size, and be disposed at a second distance from the center of the surface. The method can further comprise suspending from a plurality of suspension points, the movable membrane to be substantially parallel to, and separated by a gap from, the substantially rigid layer, with the plurality of pedestals being disposed to extend into the gap. In one or more embodiments, the method can further comprise, disposing a capacitance sensor to detect, in a micro-electro-mechanical system (MEMS), a capacitance change caused by movement of the movable membrane. In another aspect of the method, at least one of the plurality of pedestals are disposed so as to limit a deformation of the movable membrane. In another aspect, the first size can be selected so as to limit a deformation of the movable membrane.

In another aspect, a stress on the movable membrane can be limited based on the limiting the deformation of the movable membrane. In another aspect, the stress on the movable membrane is limited at a suspension point of the plurality of suspension points. In a variation of the one or more embodiments described herein, the first pedestal can be shorter than the second pedestal. In another aspect, the first distance can be closer to the center than the second distance. In one or more embodiments, the MEMS sensor of the method can be one of an acoustic sensor or a pressure sensor.

BRIEF DESCRIPTION OF THE DRAWINGS

Non-limiting embodiments of the subject disclosure are described with reference to the following figures, wherein like reference numerals refer to like parts throughout the various views unless otherwise specified.

DETAILED DESCRIPTION

Aspects of the subject disclosure will now be described more fully hereinafter with reference to the accompanying drawings in which example embodiments are shown. In the following description, for purposes of explanation, numerous specific details are set forth in order to provide a thorough understanding of the various embodiments. However, the subject disclosure may be embodied in many different forms and should not be construed as limited to the example embodiments set forth herein.

Reference throughout this specification to "one embodiment," "an embodiment," or "one or more embodiments" can be an indication that a particular feature, structure, or characteristic described in connection with the embodiment is included in at least one embodiment. Thus, the appearances of the phrase "in one embodiment," "in an embodiment," and "in one or more embodiments" in various places throughout this specification are not necessarily all referring to the same embodiment. Furthermore, the particular features, structures, or characteristics may be combined in any suitable manner in one or more embodiments.

Furthermore, to the extent that the terms "includes," "has," "contains," and other similar words are used in either the detailed description or the appended claims, such terms are intended to be inclusive—in a manner similar to the term "comprising" as an open transition word—without precluding any additional or other elements. Moreover, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Furthermore, the word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art.

Figure 1:
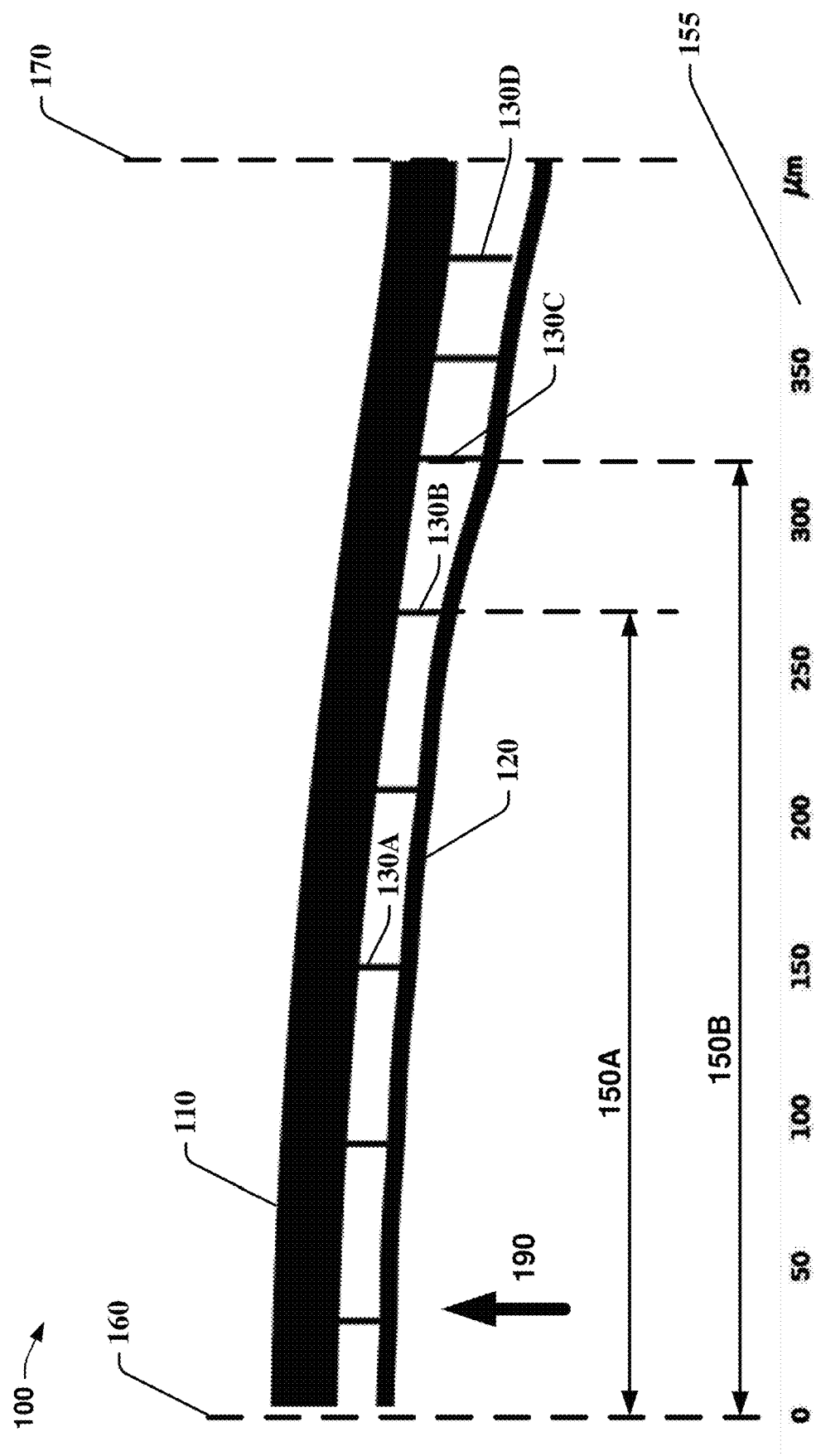
FIG. 1 depicts a cross-section of MEMS sensor 100 comprising substantially rigid layer 110, movable membrane 120, and pedestals 130A-B, in accordance with one or more embodiments.

FIG. 1 depicts a two-dimensional axisymmetric cross-section of MEMS sensor 100 comprising substantially rigid layer 110, movable membrane 120 suspended from suspension point 170, and pedestals 130A-D disposed in a gap between substantially rigid layer 110 and movable membrane 120, in accordance with one or more embodiments. As discussed further herein, for illustrative purposes, MEMS sensor 100 is depicted as having deformed elements, e.g., substantially rigid layer 110 and movable membrane 120 are deformed in accordance with force 190.

As would be appreciated by one having skill in the relevant art(s), given the disclosure herein, in some implementations, MEMS sensor 100 can operate when sound or other types of pressure hit movable membrane 220, which, depending on the amount of pressure, can cause movable membrane 220 to move towards and away from substantially rigid layer 210, this movement causing a capacitance change which can be detected by different types of sensors.

It should be noted that substantially rigid layer 210 can also be termed a backplate, a non-moving plate, and a fixed plate, and can also have holes (e.g., termed acoustic holes and other terms) to let pressure through to movable membrane 220, these not being depicted in FIGS. of this disclosure. It should also be noted that movable membrane 220 can also be termed a diaphragm, a movable plate, a conductive plate, and other similar terms.

One having skill in the relevant art(s), given the disclosure herein will appreciate that, because MEMS sensor 100 is, by design, generally expose to aspects of the environment, force 190 can a be force to which MEMS sensor 100 can be exposed, including but not limited to, pressure from acoustic waves (e.g., sound waves propagated through air) and other forces (e.g., air from an air gun used to clean a circuit board upon which MEMS sensor 100 is disposed). As discussed herein, deformation of movable membrane 220 can, in some circumstances such as application of a large acoustic pressure, cause movable membrane 220 to hit substantially rigid layer 210. This deformation, particularly at the outer edges where the membrane is suspended or otherwise attached to the MEMS structure, can cause a very low radius of curvature that can lead to stress concentration, e.g., at the outer edges. These stress points, in some cases, being exposed to the highest stress of movable membrane 220, are discussed below in FIGS. 6 and 8, along with difference approaches that can be employed by one or more embodiments to reduce these stresses.

As discussed further below, FIG. 1 depicts MEMS sensor 100 with deformations based on a particular level of pressure from force 190, with one or more embodiments having various features that can improve how MEMS sensor 100 handles these different levels of pressure, including levels of pressure that cause a failure of implementations without benefit of the approaches described herein. In a non-limiting example, one implementation of MEMS sensor 100 has a maximum sound pressure level (max SPL) of 135-145 dB SPL, above which operation of the MEMS sensor can be impaired, and mechanical failure (e.g., of movable membrane 220) can occur, e.g., from 160-180 dB SPL being an example excess pressure range. As noted above, with some implementations of MEMS sensors being in integrated circuits on circuit boards commonly subject to cleaning by compressed air, approaches described herein can reduce a likelihood of mechanical damage from pressure overload. In should also be appreciated that, even in non-overload circumstances, by reducing stress on certain parts of MEMS sensors, one or more embodiments can extend the lifespan of these devices.

As depicted in FIG. 1, a portion of MEMS sensor 100 is shown, e.g., the half of the sensor extending from center point 160. As noted above, FIG. 1 depicts a two-dimensional 2D axisymmetric cross-section of MEMS sensor 100, e.g., in this example substantially rigid layer 110 and movable membrane 120 are circular, with other shapes being possible, in accordance with one or more embodiments. In this example, as discussed below in the examples of FIGS. 3, 7, and 8, pedestals 130A-D, are of at least two lengths, e.g., pedestals 130A-B are of a first length and pedestals 130C-D are of a second length, different than the first length. In addition, pedestals 130A-D are different distances from center point 160, e.g., pedestal 130B is distance 150A from center point 160 and pedestal 130C is distance 150B from center point 160. Example distance from center point 160 are illustrated by measurements 155, e.g., pedestals 130B and 130D are approximately 270 µm and 320 µm from center point 160, respectively.

Generally speaking, in accordance with one or more embodiments, one or more of factors that include, but are not limited to, a number of pedestals 130A-D, length of respective pedestals, distance of respective pedestals from center point 160, distance of respective pedestals from suspension point 170, and distance of respective pedestals from other pedestals, can individually affect, or be combined to affect, the stress on different components of MEMS sensor 100 based on force 190. To illustrate some of these features, example lengths of pedestals and placement distances are discussed with FIGS. 2-5 and 7 below, while example changes in stress levels on components of MEMS sensor 100 based on force 190 are discussed with FIGS. 6 and 8 below.

Figure 2:
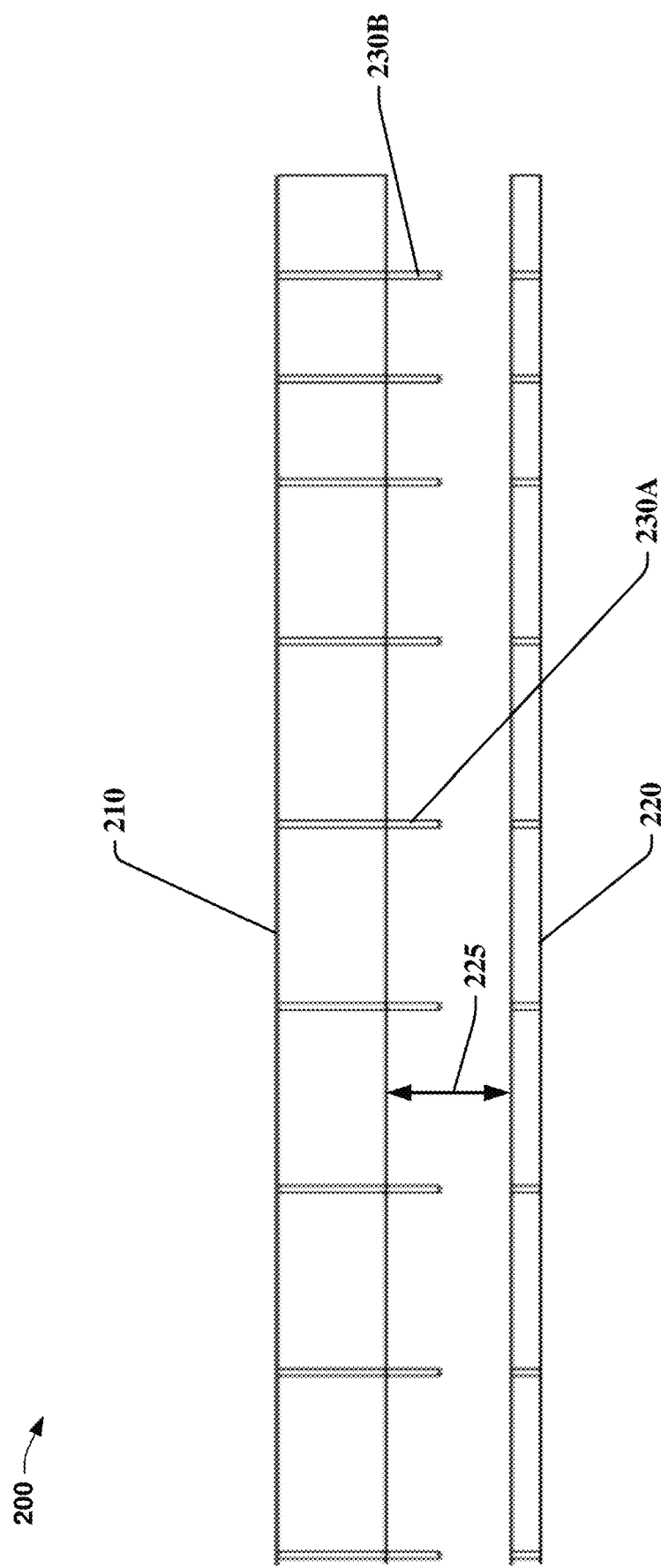
FIG. 2 depicts a block diagram of a cross section of MEMS sensor 200 comprising pedestals 230A-B of substantially equal length, in accordance with one or more embodiments.

FIG. 2 depicts a block diagram of a cross section of MEMS sensor 200 comprising pedestals 230A-B of substantially equal lengths, in accordance with one or more embodiments. Repetitive description of like elements and/or processes employed in respective embodiments is omitted for sake of brevity.

In contrast to the deformations caused by force 190 of FIG. 1, it should be noted that MEMS sensor 200 is depicted as being under zero or minimal stress, and as a result, rigid layer 110 and movable membrane 120 are depicted without deformation. Based on this lack of deformation, example pedestals 230A-B are depicted as substantially perpendicular to substantially rigid layer 110 extending into gap 225 between substantially rigid layer 210 and movable membrane 220. As noted above, for illustrative purposes, in this example, pedestals 230A-B and other pedestals depicted, are of substantially equal length.

It should be noted that FIG. 2 illustrates gap 225, which can be an air gap between substantially rigid layer 210 and movable membrane 220, as well as other instances of substantially rigid layer and movable membrane shown in the examples of FIGS. 3-8 described below.

Figure 3:
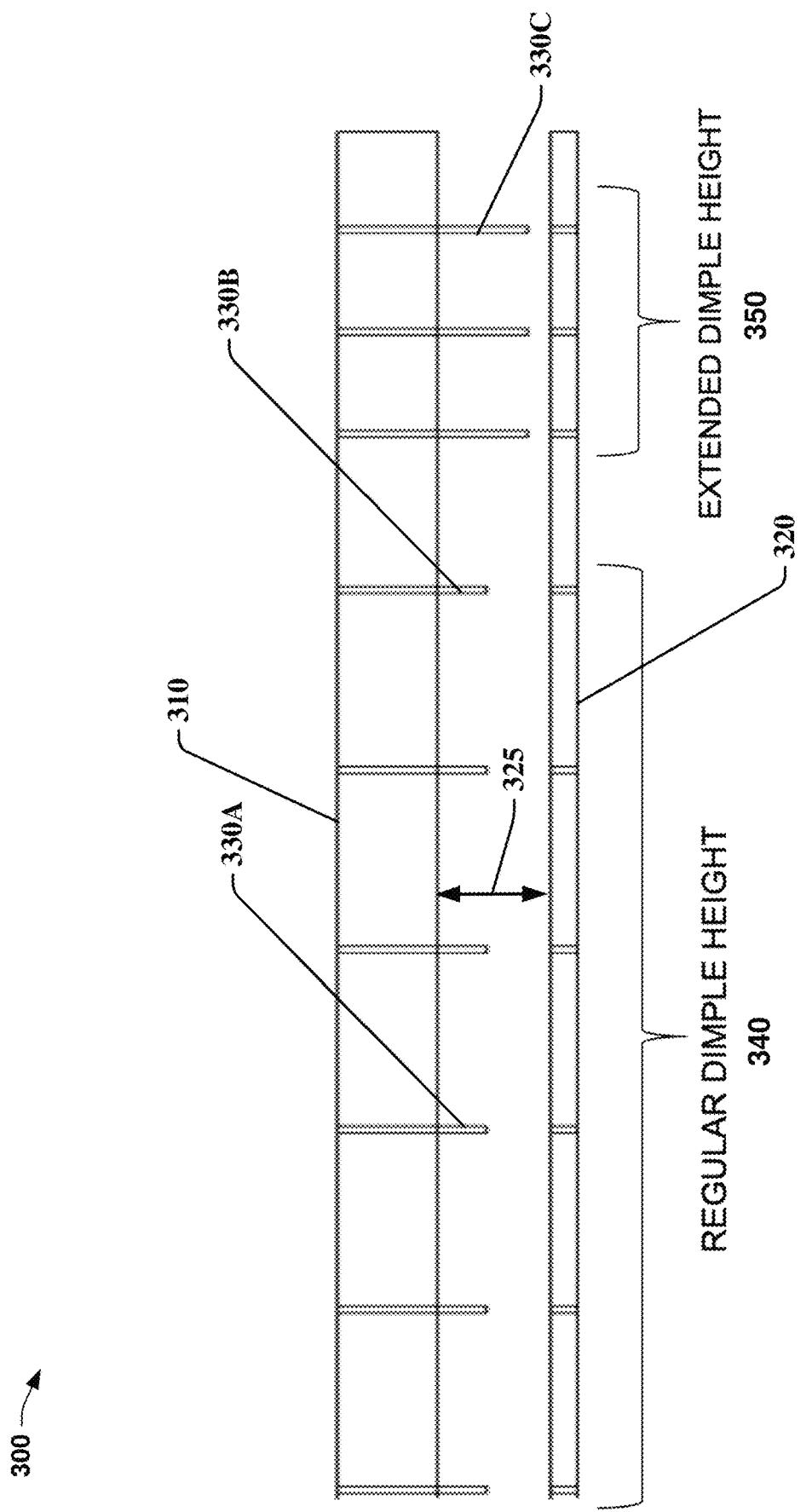
FIG. 3 depicts a block diagram of a cross section of MEMS sensor 300 comprising pedestals 330A-C, some having different lengths from other pedestals, in accordance with one or more embodiments.

FIG. 3 depicts a block diagram of a cross section of MEMS sensor 300 comprising pedestals 330A-C, some having different lengths from other pedestals, in accordance with one or more embodiments. Repetitive description of like elements and/or processes employed in respective embodiments is omitted for sake of brevity.

Like FIG. 2 described above, in FIG. 3, for illustrative purposes, substantially rigid layer 310 and movable membrane 320 are depicted as not subject to force (or subject to a minimal force) such that no deformation substantially rigid layer 310 and movable membrane 320 is depicted.

It should be noted that, in accordance with one or more embodiments, in an alternative to the examples discussed thus far, any pedestals discussed herein (e.g., in the examples of FIG. 1-3 and additional embodiments discussed below) can be disposed on either substantially rigid layer 310 as depicted or on movable membrane 220 (not shown), e.g., affixed to or a part of, movable membrane 220 extending into gap 325 toward substantially rigid layer 310. It should also be noted that, as described herein, pedestals 330A-C (as well as other example pedestals described herein) can also be referred to as dimples, protrusions, standoff elements, and other similar terms.

To illustrate some features of one or more embodiments, FIG. 3 includes labels for regular dimple height 340 (e.g., including pedestal 330A and other pedestals of substantially similar height) and extended dimple height 350 (e.g., including pedestal 330C and other pedestals of substantially similar height. As noted above, it should be noted that, although the dimples of the extended dimple height 350 group are depicted as of a substantially similar length, in one or more embodiments, to achieve various benefits described herein, different heights can be selected for the dimples of extended dimple height 350, e.g., increasing in size from the dimples adjacent to the regular dimple height dimples to the opposite end of the group (e.g., pedestal 330C). Different benefits of one or more embodiments are discussed with FIGS. 6 and 8 below, e.g., changes in stress loads under which different components are subjected based on one or more embodiments described herein.

Figure 4:
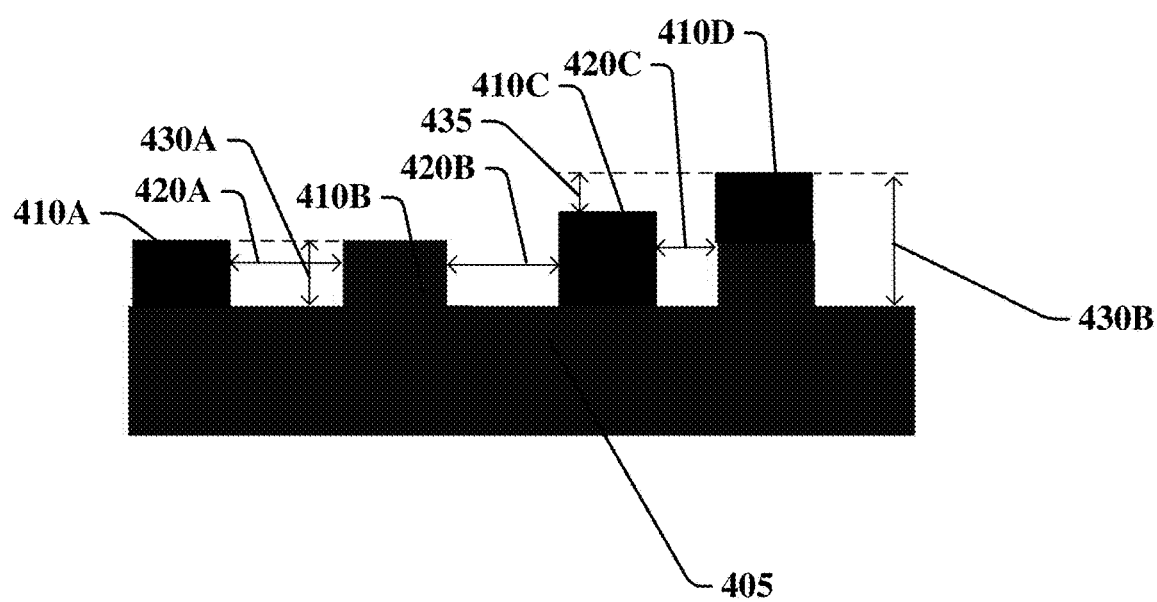
FIG. 4 depicts a block diagram of a cross section of MEMS sensor 400 comprising pedestals 410A-D disposed on substantially rigid layer 405, in accordance with one or more embodiments.

FIG. 4 depicts a block diagram of a cross section of MEMS sensor 400 that includes a more detailed view of the height 430A-B of pedestals 410A-D (as well as relative height 435) as well as the distances 420A-C between pedestals. Repetitive description of like elements and/or processes employed in respective embodiments is omitted for sake of brevity. It should be noted that, as described above, base 405, upon which pedestals 410A-D are disposed, can, in one or more embodiments, be either substantially rigid layer 310 as depicted as well as movable membrane 320.

In an alternative embodiment, various features and benefits of one or more embodiments can be achieved by individual pedestals 410A-D being variously placed on either substantially rigid layer 310 as depicted as well as movable membrane 320, e.g., pedestals 410A-B being disposed on base 405 as substantially rigid layer 310, and pedestals 410C-D being disposed on a movable membrane 320 opposite to base 405 (not shown).

As described above, differences in spacing of pedestals 410A-D can affect the results achieved by one or more embodiments, e.g., the selection of substantially similar distances 420A-B between pedestals 410A-B and distance 420C between pedestals 410C-D can affect the results of one or more embodiments, e.g., as described with FIGS. 6 and 8 below, the stress on movable membrane 320 at suspension point 170, as well as other results.

It should be noted that different distances between individual pedestals, and the length, size, composition, and any other characteristics of the pedestals can be selected for different implementations to achieve different results described and suggested by the present disclosure. For example, as depicted in FIG. 4, while pedestals 410A-B are shown with substantially the same length, pedestals 410B-D have a gradual transition between the length of pedestal 410B and 410D, e.g., based on the length of pedestal 410C. One having skill in the relevant art(s), given the description herein, would appreciate that the depicted smooth transition, as well as any other transition, can be selected in different implementations of one or more embodiments described herein.

It should be noted that other elements depicted in FIG. 4, including but not limited to, the relative differences in height between pedestals 410B-C and 410C-D, can also affect the results of one or more embodiments. As discussed further with FIG. 8 below, one approach that can be used by one or more embodiments to alter (e.g., maximize) one or more benefits is to select different heights 430A-B and distances 420A-C, so as to cause different results.

Figure 5:
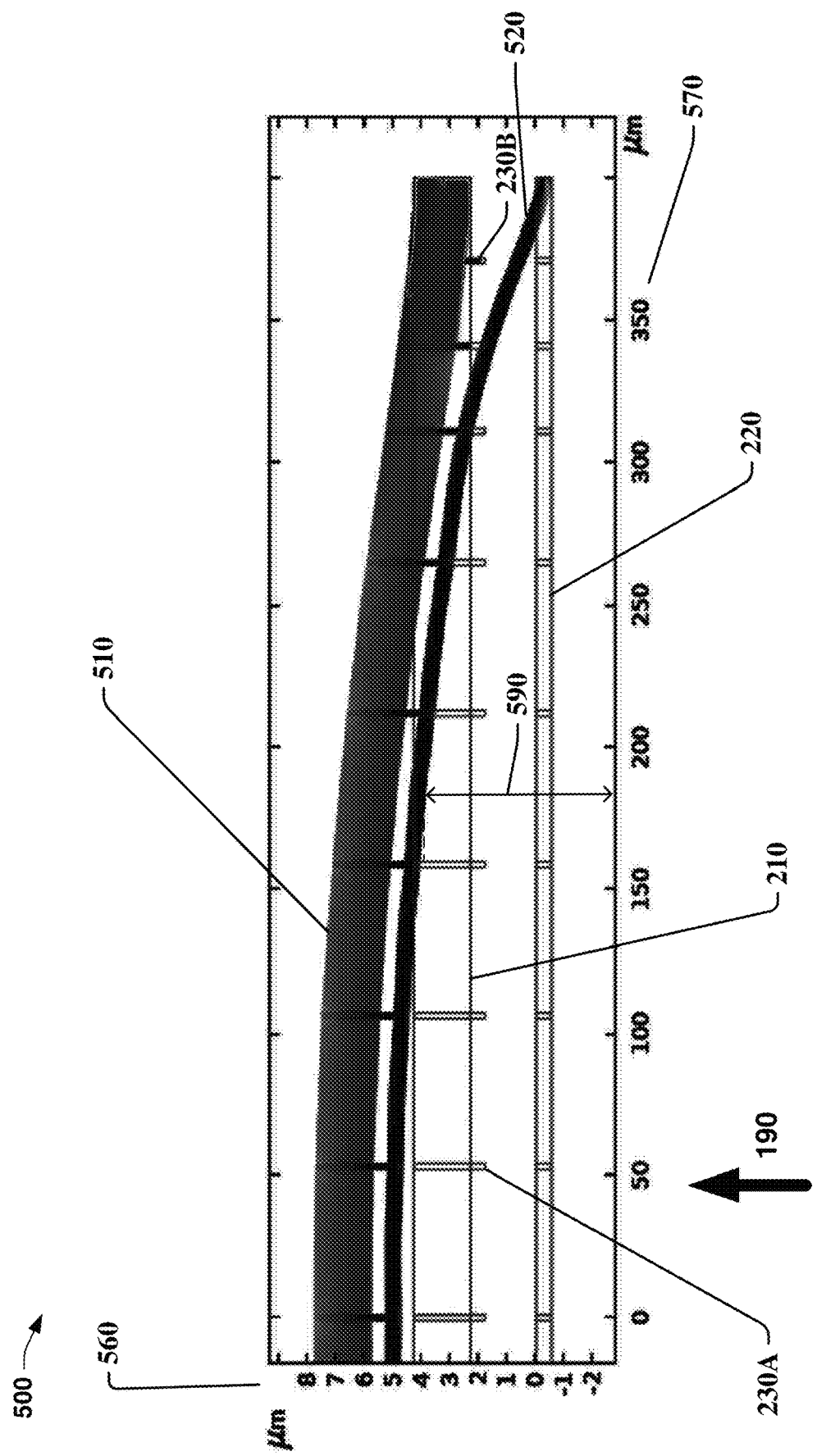
FIG. 5 depicts a block diagram of a cross section of MEMS sensor 500 where movable membrane 510 is subject to pressure levels, in accordance with one or more embodiments.

FIG. 5 depicts another, more detailed block diagram of a cross section of MEMS sensor 500 where substantially rigid layer 510 and movable membrane 520 are subject to force 190, in accordance with one or more embodiments. Repetitive description of like elements and/or processes employed in respective embodiments is omitted for sake of brevity.

For illustrative purposes, it should be noted that FIG. 5 depicts substantially rigid layer and movable membrane before and after force 190 is applied, e.g., substantially rigid layer 210 is deformed to be substantially rigid layer 510, and movable membrane 220 is deformed by distance 590 to be movable membrane 520. Example non-limiting sizes of elements can be estimated by vertical scale 560 and horizontal scale 570, though other relative sizes can also have similar results, based on various features of embodiments described herein.

It should be noted that not all pedestals 230A-B (extending from substantially rigid layer 510) are depicted as contacting movable membrane 520, e.g., while pedestal 230A is depicted as contacting movable membrane 520, a gap is depicted between pedestal 230B and movable membrane 520. The causes, results, and effects of one or more embodiments on similar gaps are discussed with FIGS. 6 and 8 below.

Figure 6:
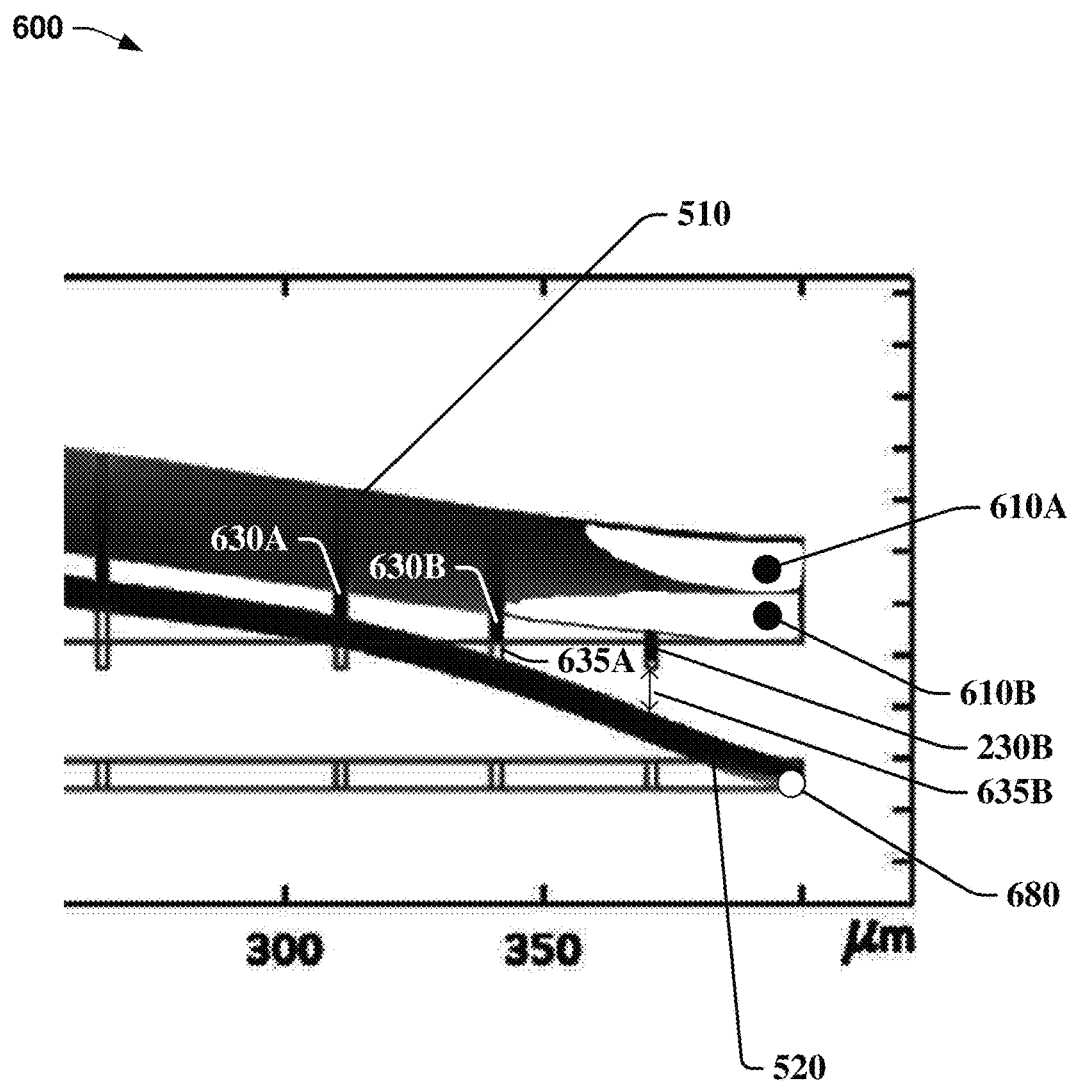
FIG. 6 depicts a more detailed view 600 of MEMS sensor 500 of FIG. 5, with stress levels labeled on both movable membrane 510 and substantially rigid layer 520, in accordance with one or more embodiments.

FIG. 6 depicts a more detailed view 600 of MEMS sensor 500 of FIG. 5, with stress levels labeled on both movable membrane 520 and substantially rigid layer 510, in accordance with one or more embodiments. Repetitive description of like elements and/or processes employed in respective embodiments is omitted for sake of brevity.

Specifically, FIG. 6 depicts pedestals 630A-C, with pedestal 630A having no gap with movable membrane 520, pedestal 630B having a gap 635A and pedestal 630C having a gap 635B larger than gap 635A. One of the results of MEMS sensor 500 operating with pedestals 630B-C having gaps 635A-B is that movable membrane 520 (e.g., at stress point 680) can be subject to stress higher than other parts of movable membrane 520.

In some circumstances (e.g., under relatively high force 190) the stress at stress point 680 and other portions of movable membrane 520 can cause movable membrane 520 to incur mechanical failure, e.g., rupture or otherwise fail. One of the benefits that can accrue from various features of one or more embodiments (e.g., pedestals of varying heights) is a relative reduction in stress on movable membrane 520, e.g., at stress point 680 and other points, as compared to the embodiments depicted in FIGS. 5 and 6.

Figure 7:
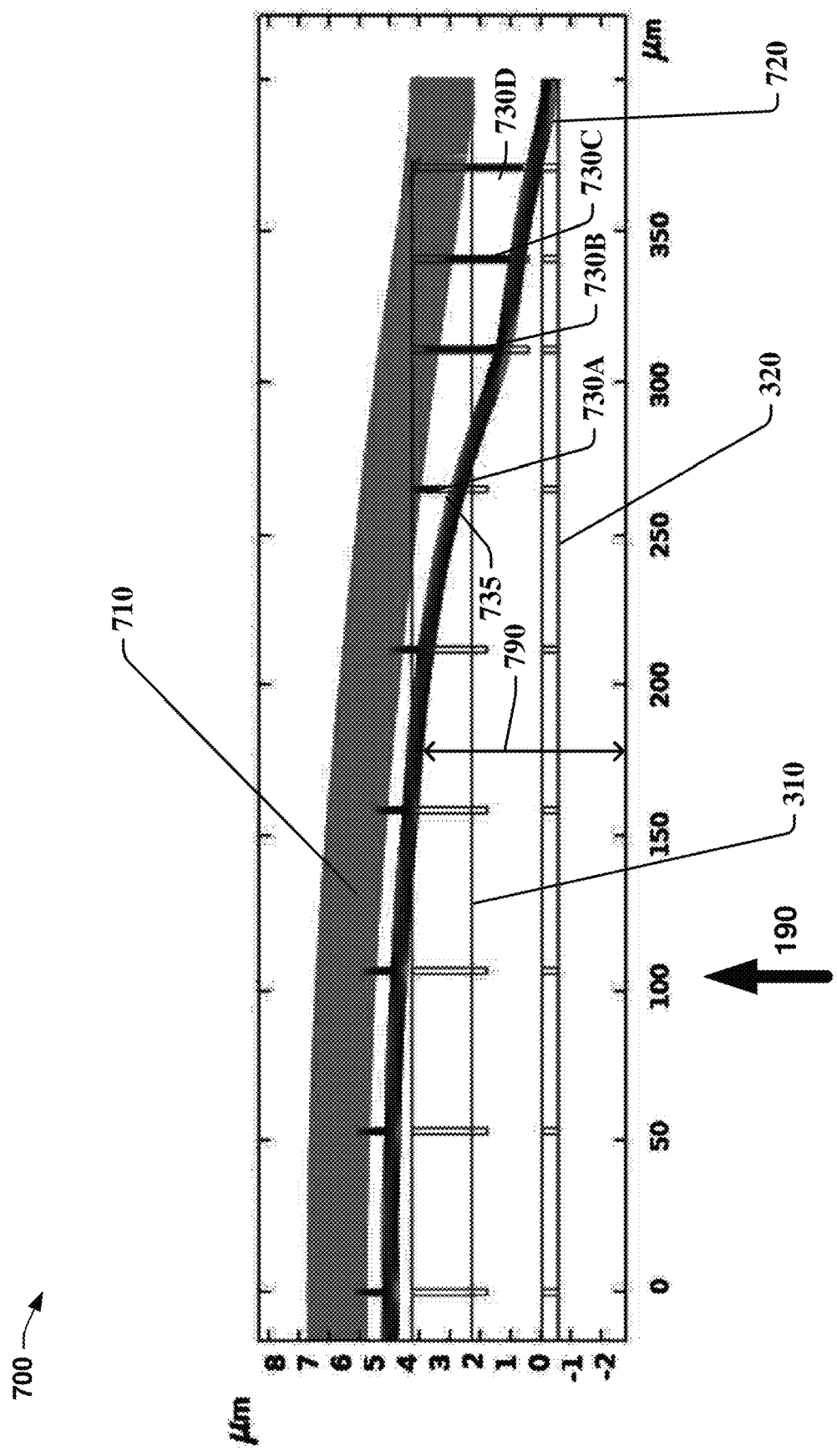
FIG. 7 depicts a block diagram of a cross section of MEMS sensor 700 comprising pedestals 710A-D disposed on substantially rigid layer 705, in accordance with one or more embodiments.

FIG. 7 depicts a block diagram of a cross section of MEMS sensor 700 comprising pedestals 730A-D disposed on substantially rigid layer 710, in accordance with one or more embodiments. Repetitive description of like elements and/or processes employed in respective embodiments is omitted for sake of brevity.

Like FIG. 5 discussed above, for illustrative purposes, it should be noted that FIG. 7 depicts the substantially rigid layer and the movable membrane before and after force 190 is applied, e.g., substantially rigid layer 310 is deformed to be substantially rigid layer 710, and movable membrane 320 is deformed by distance 790 to be movable membrane 720.

It should be noted that, unlike pedestals in similar position on FIG. 5, pedestals 730B-D are of variable length and have no gap with deformed movable membrane 720. Pedestal 730A is depicted, in this example, as having gap 735 with movable membrane 720. As noted throughout this disclosure, the existence of a gap between pedestals 730A-D is but one factor that can affect the results of one or more embodiments, e.g., stress impressed upon deformed movable membrane 720.

As discussed further with FIG. 8 below, in this example, the contact between pedestals 730B-D and deformed movable membrane 720 can affect stress imposed by force 190 on both substantially rigid layer 710 and deformed movable membrane 720.

Figure 8:
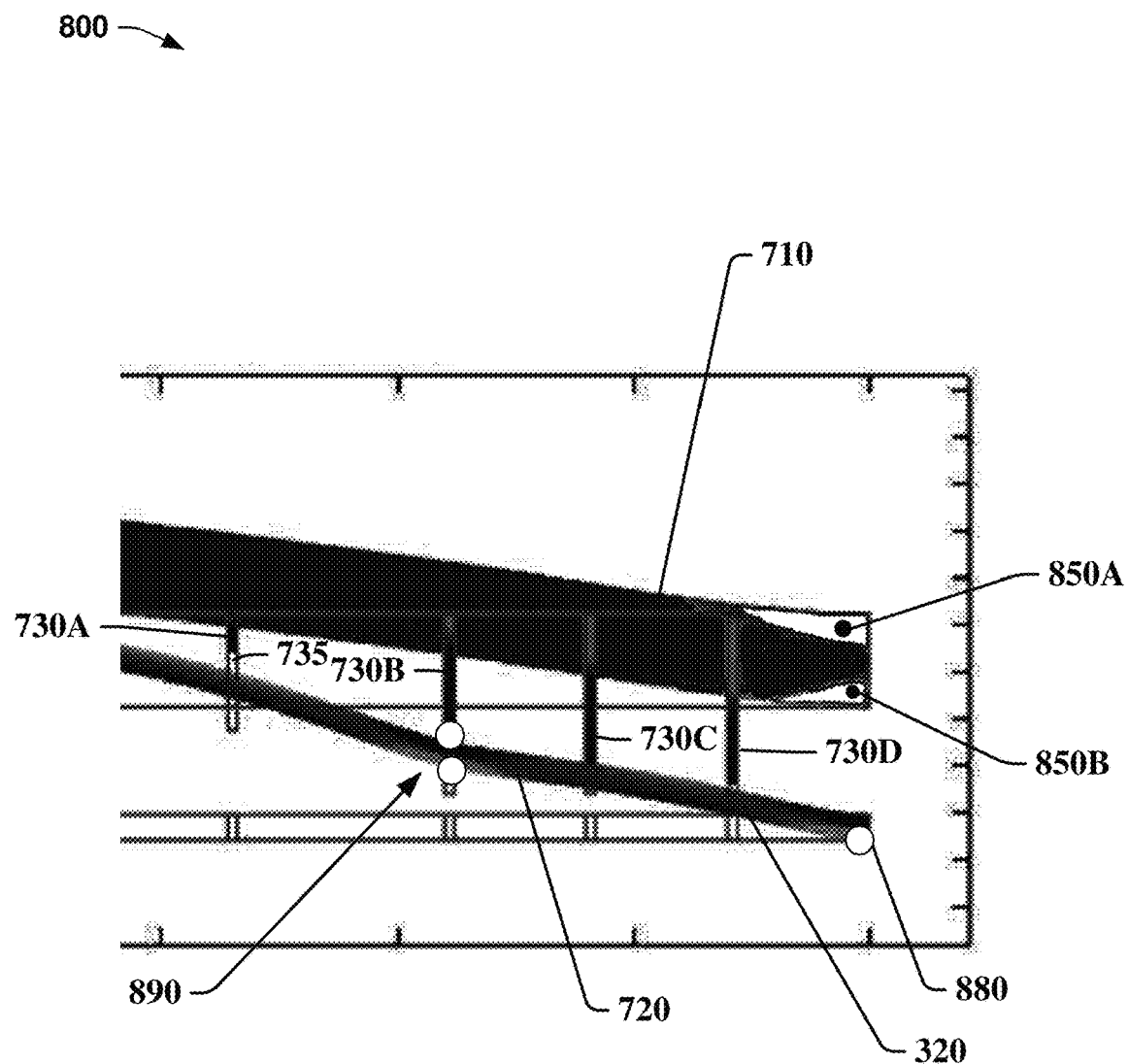
FIG. 8 depicts a more detailed view 800 of MEMS sensor 700 of FIG. 7, with stress levels labeled on both movable membrane 705 and substantially rigid layer 720, in accordance with one or more embodiments.

FIG. 8 depicts a more detailed view 800 of MEMS sensor 700 of FIG. 7, with stress areas 850A-B and 880 respectively labeled on substantially rigid layer 710 and movable membrane 720, in accordance with one or more embodiments. Repetitive description of like elements and/or processes employed in respective embodiments is omitted for sake of brevity.

As noted with the discussion of FIG. 7 above, in one or more embodiments, different aspects of pedestals 730A-B (e.g., length, placement, whether a gap with movable membrane 720 exists at different force 190 levels) can affect stress levels on one or both of substantially rigid layer 710 and movable membrane 720 as compared to not employing modified pedestals and pedestal placement (e.g., as described with the examples of FIG. 6 and FIG. 8).

For example, in the example depicted in FIG. 8 (e.g., with variable length pedestals 730A-D placed, like the distance between pedestals 730A-B, at different intervals) stress can be reduced on movable membrane 720 during the application of force 190, as compared to movable membrane 520 of FIG. 6. More specifically, in FIG. 6, with an example uniform pedestal height of 0.5 p.m, in some circumstances stress point 680 can be the point of highest stress during the application of force, e.g., a maximum von mises stress of 0.27 GPa at a force 190 of 10 kPa.

In contrast to the example stress at stress point 680, at stress point 880, based on a variable pedestal height from 0.5 µm to 1.85 µm used in the example of FIG. 8, while stress point 880 is still the highest stress point of movable membrane 720, in this example, the maximum von mises stress at stress point 880 can be reduced by 33% from the example of FIG. 6, from 0.27 GPa to 0.18 GPa. In one or more embodiments, the reduction in stress is proportional to the deflection of movable membrane 720.

Other differences in stress from the examples of FIG. 6 and FIG. 8 include at points 810A-B in substantially rigid layer 710. For example, in the implementations of FIGS. 6 and 8, at the application of 10 kPa force 190, both stress point 610A and 810A can be under similar stresses, but stress point 810A can have a lower maximum stress, e.g., a maximum von mises stress of 0.2 for stress point 880 and 0.4 for stress point 680.

It is important to note that, in some implementations and configurations, one way that stress can be beneficially reduced on components of MEMS sensor 700 (e.g., stress point 880) is by distributing stress to other components and locations on the same component, e.g., increasing stresses in these areas. For example, comparing stresses in movable membranes 520 and 720 associated with pedestals 630A and 730B, in some implementations the lower side of stress point 890 can have increased stress applied as compared to a stress point on the lower side of movable membranes 520 associated with pedestal 630A. It would be appreciated by one having skill in the relevant art(s), given the disclosure herein, that one or more embodiments can reduce stress in a high stress area (e.g., stress point 880) and balance the benefits of this reduction against potential increases in stress distributed across other parts of MEMS sensor 700.

As noted throughout this disclosure, different aspects of one or more embodiments are implementation specific, e.g., the different sizes selected for different pedestals, the number of pedestals, the spacing of the pedestals, and the placement of the pedestals on either or both of substantially rigid layer 710 and movable membrane 720. One approach that can be used by one or more embodiments to configure different aspects is an approach where a constant force 190 is selected (e.g., 10 kPa used as an example force with FIGS. 1-7 above) and stresses associated with different pedestal configurations are measured. In alternative embodiments, the experimental approach (or any other approach) can be used to develop a mathematical model of the operation of different configurations.

Figure 9:
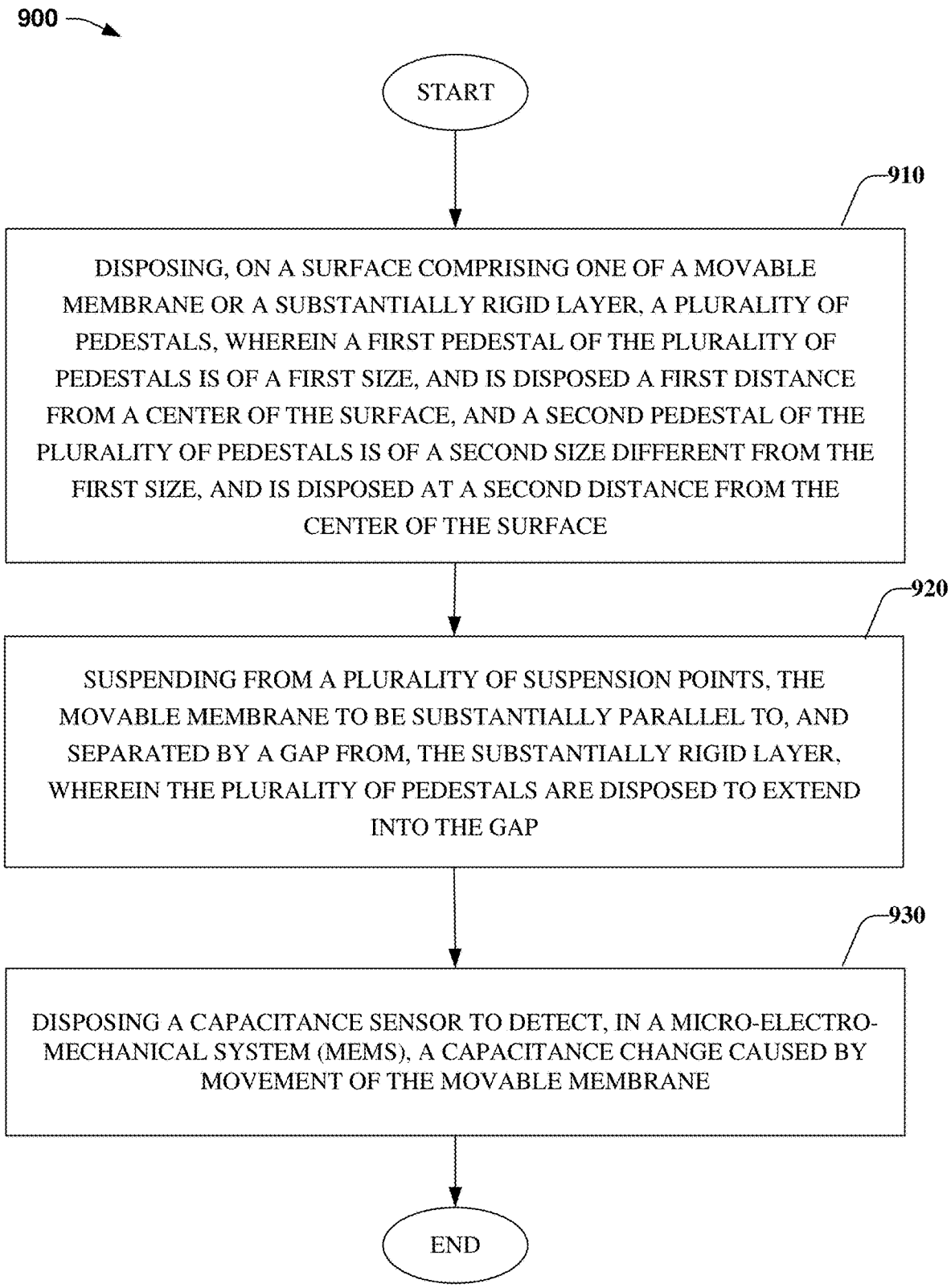
FIG. 9 illustrates an example flow diagram for a method that can facilitate forming a MEMS sensor that an reduce stresses sustained by different component of the MEMS sensor during sensor operation, in accordance with one or more embodiments.

FIG. 9 illustrates a flow diagram of an example method 900 that can facilitate forming a MEMS sensor that can reduce stresses sustained by different components of the MEMS sensor during sensor operation, in accordance with one or more embodiments. For purposes of brevity, description of like elements and/or processes employed in other embodiments is omitted. Repetitive description of like elements and/or processes employed in respective embodiments is omitted for sake of brevity.

At 910, example method 900 can dispose, on a surface comprising one of a movable membrane or a substantially rigid layer, a plurality of pedestals, with a first pedestal of the plurality of pedestals being a first size, and disposed a first distance from a center of the surface, and a second pedestal of the plurality of pedestals is of a second size different from the first size, and is disposed at a second distance from the center of the surface. For example, in one or more embodiments, method 900 can dispose, on a surface comprising one of movable membrane 120 or substantially rigid layer 110, a plurality of pedestals 130A-D, with a first pedestal 130B of the plurality of pedestals being a first size, and disposed a first distance 150A from center 160 of the surface, and a second pedestal 130C of the plurality of pedestals 130A-D is of a second size different from the first size (pedestal 130B is smaller than pedestal 130C), and is disposed at a second distance 150B from the center 160 of the surface.

At 920, example method 900 can suspend from a plurality of suspension points, movable membrane to be substantially parallel to, and separated by gap from, the substantially rigid layer, with the plurality of pedestals being disposed to extend into the gap. For example, in one or more embodiments, method 900 can suspend from a plurality of suspension points 170, movable membrane 120 to be substantially parallel to, and separated by gap 225 from, the substantially rigid layer 110, with the plurality of pedestals 130A-D being disposed to extend into the gap.

At 920, example method 900 can dispose a capacitance sensor to detect, in a micro-electro-mechanical system (MEMS), a capacitance change caused by movement of the movable membrane. For example, in one or more embodiments, method 900 can dispose a capacitance sensor to detect, in a micro-electro-mechanical system (MEMS) 100, a capacitance change caused by movement of movable membrane 120.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A micro-electro-mechanical system (MEMS) sensor, comprising:
    a substantially rigid layer based on a criterion of rigidity, having a center and an attachment point from which the substantially rigid layer is suspended;
    a movable membrane separated by a gap from, and disposed substantially parallel to, the substantially rigid layer; and
    a plurality of pedestals extending into the gap, wherein a first pedestal of the plurality of pedestals is of a first size, and is disposed a first distance from the center, and a second pedestal of the plurality of pedestals is of a second size different from the first size, and is disposed at a second distance from the center, wherein a characteristic of the first pedestal is selected to reduce stress at the attachment point.

2. The MEMS sensor of claim 1, wherein the plurality of pedestals are disposed on the substantially rigid layer, extending into the gap.

3. The MEMS sensor of claim 1, wherein the plurality of pedestals are disposed on the movable membrane, extending into the gap.

4. The MEMS sensor of claim 1, wherein the substantially rigid layer and the movable membrane are suspended by a plurality of suspension points.

5. The MEMS sensor of claim 4, wherein a stress on the movable membrane is substantially located at a membrane suspension point of the plurality of suspension points.

6. The MEMS sensor of claim 1, wherein at least one of the plurality of pedestals are disposed so as to limit a deformation of the movable membrane.

7. The MEMS sensor of claim 1, wherein the first size is selected based on a stress on the movable membrane.

8. The MEMS sensor of claim 1, wherein a reduction of a stress on the movable membrane is provided based on at least one of the plurality of pedestals being disposed so as to limit a deformation of the movable membrane.

9. The MEMS sensor of claim 1, wherein the characteristic comprises the first size.

10. The MEMS sensor of claim 1, wherein the characteristic comprises the first distance from the center.

11. The MEMS sensor of claim 1, wherein the characteristic comprises a difference in value of the first size and the second size.

12. The MEMS sensor of claim 1, wherein the characteristic comprises a difference in value of the first distance and the second distance.

13. A method, comprising:
- disposing, on a surface comprising one of a movable membrane or a substantially rigid layer based on a criterion of rigidity, a plurality of pedestals, wherein a first pedestal of the plurality of pedestals is of a first size, and is disposed a first distance from a center of the surface, and a second pedestal of the plurality of pedestals is of a second size different from the first size, and is disposed at a second distance from the center of the surface, wherein at least one of the first size and the first distance of the first pedestal is selected to reduce stress at an attachment point of the substantially rigid layer;
- suspending from a plurality of suspension points, the movable membrane to be substantially parallel to, and separated by a gap from, the substantially rigid layer, wherein the plurality of pedestals are disposed to extend into the gap; and
- disposing a capacitance sensor to detect, in a micro-electro-mechanical system (MEMS), a capacitance change caused by movement of the movable membrane.

14. The method of claim 13, wherein at least one of the plurality of pedestals are disposed so as to limit a deformation of the movable membrane.

15. The method of claim 13, wherein the first size is selected so as to limit a deformation of the movable membrane.

16. The method of claim 15, wherein a stress on the movable membrane is limited based on the limiting the deformation of the movable membrane.

17. The method of claim 16, wherein the stress on the movable membrane is limited at a suspension point of the plurality of suspension points.

18. The method of claim 13, wherein the first pedestal is shorter than the second pedestal.

19. The method of claim 13, wherein the first distance is closer to the center than the second distance.

20. The method of claim 13, wherein the MEMS sensor is one of an acoustic sensor or a pressure sensor.

* * * * *